United States Patent Office 2,992,045
Patented July 11, 1961

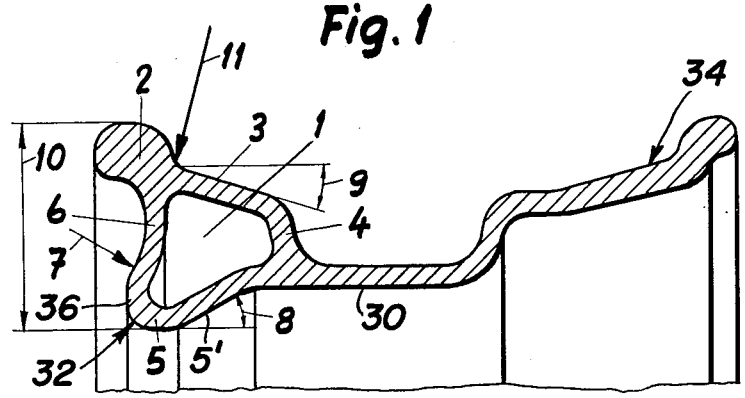
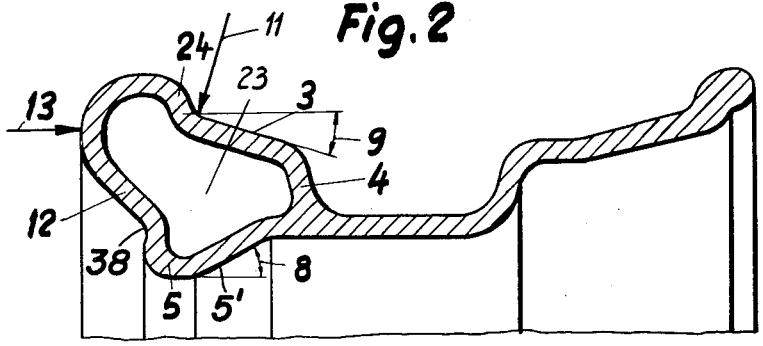
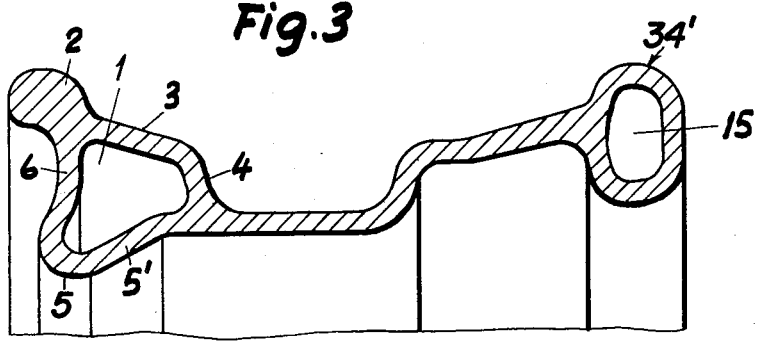

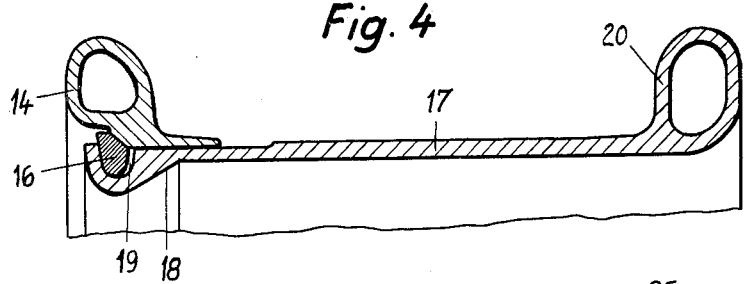
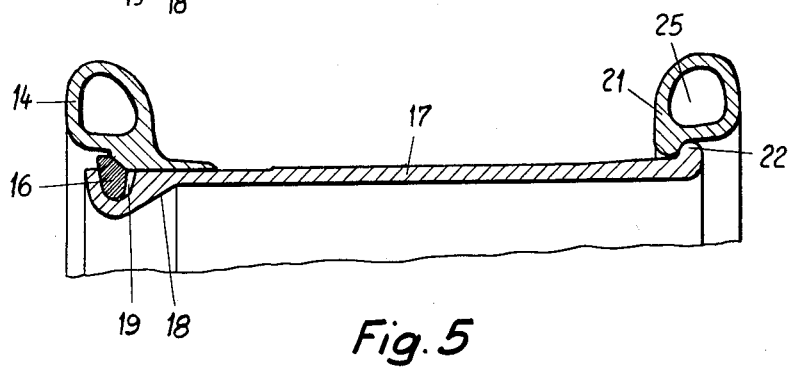

---

2,992,045
WHEEL RIMS FOR PNEUMATIC TIRE-CARRYING WHEELS OF HEAVY VEHICLES
Maurice Martenet, Rivaz, Switzerland, assignor to Georg Fischer Aktiengesellschaft, Schaffhausen, Switzerland, a Swiss company
Filed Feb. 4, 1957, Ser. No. 637,967
Claims priority, application Switzerland Feb. 14, 1956
7 Claims. (Cl. 301—97)

The present invention relates to wheel rims for heavy vehicles designed to ride on pneumatic tires.

Known to the art are wheel rims, whose edges or horns are made of a flanged, hollow, suitably profiled body. Their manufacture is, however, limited to bodies with relatively thin walls and small load capacities, since the flanging and rounding of thicker walls runs into technical production difficulties.

Also known to the art are hollow profiled rims for bicycles and light motorcycles, each of which, when viewed as a whole, constitutes a flat-pressed tube and is generally produced as such.

Wheel rims provided with hollow portions and designed for use with heavy vehicles riding on pneumatic tires have to-date only been produced of steel which always necessitates the use of costly and time consuming welding processes.

An important object of the present invention, therefore, is to provide means facilitating greatly the production of rims for wheels of heavy road-riding vehicles by virtue of the fact that at least one rim flange is constituted by a wall of an extruded hollow section or body.

A special embodiment of such a rim section has, between the flange and the foot of the rim, a web shaped and domed concavely toward the interior of the section so as to be able to yield in the sense of a more pronounced curve when the section is rounded. In an alternative embodiment of the invention, the web of the rim section curves convexly outwardly. In this embodiment, the flank of the rim section can be laterally guided during rounding and can again be corrected if necessary.

In order to reinforce the rim on the opposite side of the base thereof, it is also possible to construct the rim with a second hollow portion or space.

These and other objects of the invention will become further apparent from the following detailed description, reference being made to the accompanying drawings, showing preferred embodiments of the invention.

In the drawings:

FIG. 1 is a sectional view of a wheel rim constructed, according to the invention, with a hollow part;

FIG. 2 is a sectional view of a modified embodiment of a wheel rim having a partly hollow profile;

FIG. 3 is a sectional view of a wheel rim having two hollow spaces;

FIG. 4 is a sectional view of a wheel rim with a hollow profile and having a detachable side ring; and FIG. 5 is a sectional view of a modified embodiment of a wheel rim with such a hollow profile and having two detachable side rings.

Referring more particularly to the drawings, the invention embodied therein in FIG. 1 indicates an extruded wheel rim having a central section 30 and two lateral edge sections generally designataed 32 and 34. One of the lateral edge sections 32 is provided with a hollow space 1. The space 1 is formed with an axially outwardly and radially upwardly extending horn or flange 2 of the rim, a shoulder flank 3 for the bead of the tire, a drop center flank 4, a gutter portion or rim foot 5 and a cross piece or rib 6 curving concavely radially and axially inwardly between horn 2 and a wheel rim or edge 36 and having a radius of curvature 7. The foot or gutter portion 5 serves to fix the rim to a wheel body (not shown) and includes a portion 5' which is inclined in an axially inwardly and radially upward direction, for this purpose, at an angle indicated 8 to the horizontal. The shoulder flank 3 is also inclined at an angle indicated 9 to the horizontal.

During rounding of this rim from the straight extruded bar section, the curvataure of the web 6 is increased, i.e., the radius of curvature 7 becomes smaller. This also causes the gutter wall angle 8 and the shoulder flank angle 9 to decrease in proportion to the height 10 of the rim section. The resultant of the tire load when operating at greatest load, including radial load, is shown by an arrow 11 and has almost the same direction as the crosspiece or web 6.

Referring now to FIG. 2, it will be seen that the wheel rim may be provided with a crosspiece 12 which is generally convex between the top of a flange 24 and an indented portion 38. This construction transmits the radial loads indirectly and elastically i,.e., the load resultant occurring in the direction 11 is no longer directly taken up or absorbed by a web or crosspiece, but is indirectly and elastically transmitted to the foot or gutter portion 5 of the rim. This has the considerable advantage that the extruded section can also be laterally guided during rounding.

Lateral pressure may, furthermore, be exerted in the direction 13 to enable subsequent profile corrections to be undertaken at the gutter wall angle 8 and at the shoulder flank angle 9, even if these angles had been made too small during a previous rounding operation. The profile of the rim flange or horn 24 is equal to that shown in FIG. 1. However, the hollow space 23 is somewhat larger, i.e., the flange 24 instead of being formed as a horn such as 2 FIG. 1 it has a thinner wall and is used as a part of the wall for the hollow space 23, in the manner of the drop base flank 4 or the crosspiece 12.

FIG. 3 shows a similar extruded wheel rim, the construction of the rim base being analogous to that of FIG. 1, the hollow space 1 being formed by foot or gutter portion 5, crosspiece or web 6, flange or horn 2, shoulder flank 3 and drop center flank 4. The lateral edge section 34 of FIG. 3, however, is provided with a second hollow space 15 which is located on the opposite side of the base of the rim, in order to give the rim a great rigidity or stability of form on both sides. Instead of using a second hollow space 15 according to FIG. 3, it is, of course, possible, for the purpose of achieving a similar stability, to employ a solid or non-hollow section which is strengthened by provision of ribs or similar additions of extra material.

FIG. 4, in contradistinction to the foregoing, shows an extruded, laterally separable flat base rim, consisting of an annular central section or shell 17 and having lateral edge sections including a foot or gutter portion 18, a horn or flange 20 and a detachable side ring 14, as well as a locking ring 16 which is inserted into an annular groove 19 of the gutter portion 18 and locks the overlying side ring 14 against displacement away from the rim shell or center 17.

The detachable side ring 14 is constituted by an extruded hollow section. A second hollow space is arranged in the flange 20 on that side of the rim which is opposite the gutter portion 18. The major part of the wheel rim consisting of the portions 17, 18 and 20 is also initially formed as a bar or substantially plane, elongated strip by means of an extrusion process and is then transformed into the desired rim shape having a predetermined diameter by subsequent rounding or bending.

In the embodiment of FIG. 5, the shape of the extruded, loose side ring 14 is the same as that shown in FIG. 4. However, the second hollow space 25, arranged on the side of the rim opposite the gutter portion 18, is not integral with or fixedly connected to the rim shell 17, but is provided by a loose ring 21. Projections 22 on the shell portion 17 prevent the ring 21 from being pressed away laterally by the tire and aid in centering of the latter. For purposes of assembly, locking ring 16 and side ring 14 are removed and ring 21 is then pushed over the rim center 17 into the position shown in FIG. 5.

The rims shown in FIGS. 1 to 5 are preferably made of light-metal extruded sections. Depending on the shape or profile of the foot or gutter portion of the rim, it is possible to develop other shapes of the rim from extruded hollow sections, particularly since extrusion processes permit attainment of a great variety of section shapes in contrast to rolling processes which are limited as to the shapes attainable and do not admit of production of sections with hollow spaces and undercuts.

The wheel rims constructed in accordance with the invention are supported and held as so-called demountable rims on a wheel body which may itself be made of cast steel. Such demountable rims heretofore were usually constructed as drop center rims and were then provided with a supporting ring arranged on one side of the rim center and attached thereto by means of a circumferential weld seam. The production and welding of the supporting ring are, however, expensive operations, and the rims of the present invention are, therefore, superior to those used in the past.

The advantages of the above-described rim constructions according to the present invention are the following:

(1) High stability of form with small weight.
(2) Smaller unsprung weights on the vehicle.
(3) No separately installed adapter ring for fastening or supporting the rim is required. For the same reason, there is no need for a circumferentially extending weld seam.
(4) The production of the extruded sections is simple and inexpensive.
(5) In contradistinction to rims made of sheet metal, rims according to the invention may be made with wall thicknesses varying in dependance on the stresses and strains to which the wheels and their rims are to be subjected. This result is not possible in the case of rolled sheet metal rims.
(6) The supporting crosspiece or web of the hollow rim section has an orientation corresponding approximately to the direction of the load exerted by the tire on the rim.
(7) Extensive possibilities of shaping the section when compared with rolled sections.

From the foregoing it will be seen that in accordance with the present invention there has been provided a novel and greatly improved wheel rim for use in connection with pneumatic tire-carrying wheels of heavy vehicles, said rim comprising essentially a central section which may be either a drop base shell or a flat base shell, and two lateral edge sections positioned on opposite sides of the central section, at least one of these lateral edge sections being extruded in the form of a hollow structural member.

Advantageously, the entire rim, including both the central section and the edge sections, is extruded and made of light metal, and the hollow space of the aforesaid one lateral edge section is defined by a shoulder and a gutter portion diverging from a common part of the central section and having their remote parts or extremities joined by a transverse web.

The hollow edge section may be either integral with or separable from the central section, and both lateral edge sections may be made hollow as well as either integral with or separable from the central section.

Various changes and modifications may be made without departing from the spirit and scope of the present invention and it is intended that such obvious changes and modifications be embraced by the annexed claims.

Having thus described the invention, what is claimed as new and desired to be secured by Letters Patents, is:

1. A heavy duty extruded wheel rim construction comprising a central substantially straight section, a first lateral edge section connected to one side of said central section and having an outer side wall defining one side of said wheel rim, a second lateral edge section joined to the opposite side of said central section and having an outer side wall defining the opposite side of said wheel rim, said first lateral edge section having walls enclosing a hollow space and including a drop center flank formed as an integral continuation of said central section and extending axially and radially outwardly at an angle from said central section, a shoulder flank extending upwardly at an angle from said drop center flank, a flange portion defining the axially outer edge of said wheel rim and connected to said shoulder flank, a gutter portion formed as an integral continuation of said central section and extending axially outwardly and radially inwardly from the juncture of said drop center flank and said central section and terminating in an outer rim foot, and a crosspiece connected between said flange and said rim foot.

2. A heavy duty extruded wheel rim construction according to claim 1, wherein said flange portion includes a solid thickened portion forming an outwardly extending horn.

3. A heavy duty extruded wheel rim construction according to claim 1, wherein said crosspiece is curved inwardly between said flange and said rim foot.

4. A heavy duty extruded wheel rim construction according to claim 1, wherein said crosspiece is disposed to lie substantially parallel to the resultant tire load which will act on said rim.

5. A heavy duty extruded wheel rim construction according to claim 1, wherein said crosspiece is disposed at an angle to the direction of the resultant tire force acting on said rim.

6. A heavy duty extruded wheel rim construction according to claim 1, wherein said crosspiece includes a substantially radial wall portion extending radially outwardly from said rim foot and an inclined portion connecting said radially outwardly extending portion and said flange, said inclined portion having a convex curvature.

7. A heavy duty extruded wheel rim construction according to claim 1, wherein said second lateral edge section includes wall means defining a hollow space.

References Cited in the file of this patent

UNITED STATES PATENTS

| | | |
|---|---|---|
| 796,873 | Seiberling | Aug. 8, 1905 |
| 2,288,013 | Moynahan et al. | June 30, 1942 |
| 2,825,961 | Woodward | Mar. 11, 1958 |

FOREIGN PATENTS

| | | |
|---|---|---|
| 1,925 | Great Britain | Jan. 28, 1893 |
| 12,930 | Great Britain | June 9, 1898 |
| 687,059 | Great Britain | Feb. 4, 1953 |
| 754,250 | Great Britain | Aug. 8, 1956 |